United States Patent [19]
Deeken et al.

[11] Patent Number: 6,114,404
[45] Date of Patent: Sep. 5, 2000

[54] RADIATION CURABLE INK COMPOSITIONS AND FLAT PANEL COLOR FILTERS MADE USING SAME

[75] Inventors: John S. Deeken, Big Flats, N.Y.;
Ronald E. Johnson, Tioga, Pa.;
Lung-Ming Wu, Horseheads, N.Y.;
Khalil M. Moussa, Stevenson Ranch, Calif.

[73] Assignee: Corning Incorporated, Corning, N.Y.

[21] Appl. No.: 09/274,447

[22] Filed: Mar. 22, 1999

Related U.S. Application Data

[60] Provisional application No. 60/079,018, Mar. 23, 1998.

[51] Int. Cl.<sup>7</sup> ...................................................... C08F 2/46
[52] U.S. Cl. ................................ 522/88; 522/33; 522/81; 522/71; 522/100; 522/104; 522/102; 522/182; 522/153; 522/151; 430/7; 430/25; 430/256; 106/31.13; 106/31.37; 106/31.28; 106/31.6
[58] Field of Search ................................ 430/7, 25, 256; 522/33, 81, 71, 88, 100, 104, 101, 102, 182, 153, 151; 106/31.13, 31.37, 31.28, 31.6

[56] References Cited

U.S. PATENT DOCUMENTS

| | | | |
|---|---|---|---|
| 4,425,469 | 1/1984 | Emmons et al. | 524/750 |
| 5,034,244 | 7/1991 | Berrer et al. | 427/511 |
| 5,258,261 | 11/1993 | Heller | 430/273 |
| 5,262,275 | 11/1993 | Fan | 430/273.1 |
| 5,393,725 | 2/1995 | Abe et al. | 503/227 |
| 5,544,582 | 8/1996 | Bocko et al. | 101/211 |
| 5,624,775 | 4/1997 | Carre et al. | 430/7 |
| 5,635,331 | 6/1997 | Kangas et al. | 430/260 |
| 5,645,963 | 7/1997 | Chang | 430/7 |
| 5,678,483 | 10/1997 | Johnson | 101/153 |
| 5,701,815 | 12/1997 | Bocko et al. | 101/211 |
| 5,752,442 | 5/1998 | Johnson et al. | 101/211 |
| 5,792,856 | 8/1998 | Allen et al. | 536/66 |
| 5,854,300 | 12/1998 | Gould et al. | 522/85 |
| 5,887,522 | 3/1999 | Bocko et al. | 101/211 |
| 5,897,727 | 4/1999 | Staral et al. | 156/99 |
| 5,972,545 | 10/1999 | Eid et al. | 430/7 |

*Primary Examiner*—James J. Seidleck
*Assistant Examiner*—Sanza McClendon
*Attorney, Agent, or Firm*—Maurice M. Klee

[57] ABSTRACT

The present invention relates to a radiation curable ink formulation which has a tan δ of from about 0.5 to about 1.5. The radiation curable ink formulation includes a pigment, a radiation cross-linkable monomer or oligomer, and a rheology modifier. Flat panel color filters which contain a black radiation curable ink formulation and one or more colored radiation curable ink formulations are also disclosed. At least one of the black and colored radiation curable ink formulations has a tan δ of from about 0.5 to about 1.5 and includes a pigment, a radiation cross-linkable monomer or oligomer, and a rheology modifier. Methods for manufacturing these flat panel color filters are also disclosed. The radiation curable ink formulations of the present invention have the advantage of permitting clean doctoring. When used with black pigments to produce a raised black matrix surface pattern on a transfer layer, intrusion of the black ink into the areas occupied by colored inks is minimal, thus producing flat panel color filters with reduced haze when compared to previously-known flat panel color filters. Also described is a radiation curable formulation containing a radiation cross-linkable monomer or oligomer; a photoinitiator selected from the group consisting of 2-benzyl-2-dimethylamino-1-(4-morpholinophenyl)-butan-1-one, 2,4,6-trimethylbenzoyl diphenyl phosphine oxide, bis(2,4,6-trimethylbenzoyl) phenyl phosphine oxide, and combinations thereof; and chloropropoxythioxanthone. The radiation curable formulation has exceptionally high cure rate.

16 Claims, 6 Drawing Sheets

RADIATION CURABLE INK COMPOSITIONS AND FLAT PANEL COLOR FILTERS MADE USING SAME

CROSS REFERENCE TO RELATED PROVISIONAL APPLICATION

This application claims the benefit under 35 USC §119(e) of U.S. Provisional application Ser. No. 60/079,018 filed Mar. 23, 1998, the content of which in its entirety is hereby incorporated by reference.

FIELD OF INVENTION

The present invention relates, generally, to flat panel color filters and radiation curable inks useful in their manufacture.

BACKGROUND OF THE INVENTION

Liquid crystal displays ("LCDs") of relatively small size have been commercially available for over two decades. Recent improvements have permitted development of large size, high resolution displays which are useful in notebook and desktop computers. These LCD panels, particularly color LCD panels, are also used for flat screen televisions, projection television systems, and camcorder view finders. Many more applications are anticipated in the future.

LCD panels are of two types: passive matrix LCDs and active matrix LCDs ("AMLCDs"). Passive matrix displays employ transparent electrodes patterned in perpendicular striped arrays on facing glass plates. Red, green, and blue color filters on the inner surface of one of the glass plates provide the full color display. The passive matrix display is thought to be easier to fabricate than AMLCDs but has much more limited performance capabilities.

The fabrication of AMLCDs involves several steps. In one step, the front glass panel is prepared. This involves deposition of a color filter element onto a suitable substrate, such as glass. Color filter deposition typically involves depositing a black matrix pattern and three primary (typically either red, green, and blue or yellow, magenta, and cyan) color dot or color cell patterns within the spaces outlined by the black matrix. The printed lines which form the black matrix typically are about 15–40 microns wide and about 0.5 to 2 microns thick. The color cells are typically on the order of about 70 to 100 microns in width by 200 to 300 microns in length. The color cells are typically printed in films less than about 10 microns thick, and preferably less than 5 microns thick, and must be evenly applied and accurately registered within the pattern formed by the black matrix. The front glass substrate is typically completed by depositing a planarizing layer, a transparent conducting layer, and a polyimide alignment layer over the color filter element. The transparent conducting layer is typically indium tin oxide ("ITO"), although other materials can also be utilized. In a second step, a separate (rear) glass panel is used for the formation of thin film transistors or diodes, as well as metal interconnect lines. Each transistor acts as an on-off switch for an individual color pixel in the display panel. The third and final step is the assembly of the two panels, including injection of a liquid crystal material between the two panels to form the liquid crystal panel.

One of the most critical steps in manufacturing the color filter is the preparation of the black matrix pattern. The definition or sharpness of the edge of the black matrix is extremely important for several reasons. Unlike the colored ink cells, any variation in the black matrix edge, for example, caused by printing flow or unclean doctoring, is readily discernable when the final product is inspected. The color pixel edge, on the other hand, is typically hidden by the black matrix pattern. Consequently, to a certain extent, the black matrix hides imperfections in the color pixel edge, while there is nothing to hide imperfections in the black matrix.

The edge definition of the black matrix also affects the registration of the black matrix pattern with the thin film transistors or diodes located on the separate (rear) glass panel. Registration of the color pixels is also important, but to a lesser degree, because, the width of the black matrix pattern hides the transition area between individual color pixels and, thus, provides some leeway in registering the color pixels.

Unfortunately, while some printing techniques have successfully been employed to produce the color ink dots which make up the color pixels, the drive to achieve thinner (and thus higher resolution) black matrix lines has pushed the resolution capabilities of conventional printing techniques to their limit, because it becomes extremely difficult to maintain the required sharp edge definition using printing techniques. One of the problems associated with ink printing techniques arises from the inks' surface tension which tends to produce grid lines having rounded cross-sectional shapes.

The tendency of inks to produce grid lines having rounded cross-sectional shapes was addressed in U.S. Pat. No. 5,514,503 to Evans et al ("Evans"). However, while a significant advance, the Evans process has several shortcomings. In particular, the inks employed in Evans fail to doctor clearly resulting in black ink being left in the colored pixel area. In addition to being visually discernable, the black residue in the pixel area makes registration between the black matrix pattern and the thin film transistors or diodes difficult. In other imaging technologies, such as gravure printing, doctoring characteristics are controlled by the addition of solvents or mixtures of solvents having different evaporation rates. The thickness differences produces differences in the degree of solvent evaporation and, consequently, dryness between the etch and background. As a result, the etch and background have different degrees of tackiness which permits the selective transfer of only the material in the etch. However, the use of solvents in LCD manufacturing processes is undesirable because of the time it takes for the solvent to evaporate and because of the unreproducible and uncontrollable shrinkage which the inks experience upon evaporation of the solvent. Furthermore, inks which harden by solvent evaporation are a major contamination source, because the dried residue (for example on the background) tends to flake off. Therefore, conventional methods for adjusting an ink's doctoring characteristics are not applicable when using the preferred 100% solids ink.

For the above reasons, there is a need for an ink suitable for use in color filter display manufacture that doctors cleanly without the addition of solvent. Moreover, there is a need for fast-curing radiation curable formulations that are suitable for use in the preparation of ink formulations. The present invention is directed to meeting these needs.

SUMMARY OF THE INVENTION

The present invention relates to a radiation curable ink formulation which has a tan δ of from about 0.5 to about 1.5. The radiation curable ink formulation includes a pigment, a radiation cross-linkable monomer or oligomer, and a rheology modifier.

The present invention also relates to a flat panel color filter. The flat panel color filter includes a substrate, a black radiation curable ink formulation disposed on said substrate in a pattern of raised grid elements, and one or more colored radiation curable ink formulations disposed on said substrate between the raised grid elements. At least one of the black radiation curable ink formulation and the colored radiation curable ink formulations has a tan δ of from about 0.5 to about 1.5 and includes a pigment, a radiation cross-linkable monomer or oligomer, and a rheology modifier.

The present invention also relates to a method for producing a flat panel color filter. A black radiation curable black ink formulation is deposited onto a first portion of a substrate in a pattern of grid elements. One or more colored radiation curable ink formulations are deposited on a second portion of the substrate, the second portion of the transfer layer being spatially distinct from the first portion. At least one of the black radiation curable ink formulation and colored radiation curable ink formulations has a tan δ of from about 0.5 to about 1.5 and includes a pigment, a radiation cross-linkable monomer or oligomer, and a rheology modifier. The method further includes exposing the black radiation curable ink formulation to actinic radiation under conditions effective at least partially to cure the black radiation curable ink formulation and exposing the one or more colored radiation curable ink formulations to actinic radiation under conditions effective at least partially to cure the one or more colored radiation curable ink formulations.

The present invention further relates to radiation curable formulations which include the following: a radiation cross-linkable monomer or oligomer; a photoinitiator selected from the group consisting of 2-benzyl-2-dimethylamino-1-(4-morpholinophenyl)-butan-1-one, 2,4,6-trimethylbenzoyl diphenyl phosphine oxide, bis(2,4,6-trimethylbenzoyl) phenyl phosphine oxide, and combinations thereof; and chloropropoxythioxanthone.

The present invention is also related to a flat panel color filter which includes a substrate, a black radiation curable ink formulation, and one or more colored radiation curable ink formulations. The black radiation curable ink formulation is disposed on the substrate in a pattern of raised grid elements, and the one or more colored radiation curable ink formulations are disposed on the substrate between the raised grid elements. At least one of the black radiation curable ink formulation and the colored radiation curable ink formulations includes a pigment; a radiation cross-linkable monomer or oligomer; a photoinitiator selected from the group consisting of 2-benzyl-2-dimethylamino-1-(4-morpholinophenyl)-butan-1-one, 2,4,6-trimethylbenzoyl diphenyl phosphine oxide, bis(2,4,6-methylbenzoyl) phenyl phosphine oxide, and combinations thereof; and chloropropoxythioxanthone.

The present invention also relates to a method for producing a flat panel color filter. The method includes depositing a black radiation curable ink formulation onto a first portion of a substrate in a pattern of grid elements and depositing one or more colored radiation curable ink formulations on a second portion of the substrate, distinct from the first portion of the substrate. At least one of the black radiation curable ink formulation and the colored radiation curable ink formulations includes a pigment; a radiation cross-linkable monomer or oligomer; a photoinitiator selected from the group consisting of 2-benzyl-2-dimethylamino-1-(4-morpholinophenyl)-butan-1-one, 2,4,6-trimethylbenzoyl diphenyl phosphine oxide, bis(2,4,6-trimethylbenzoyl) phenyl phosphine oxide, and combinations thereof; and chloropropoxythioxanthone. The black radiation curable ink formulation is exposed to actinic radiation under conditions effective at least partially to cure the black radiation curable ink formulation, and the one or more colored radiation curable ink formulations are exposed to actinic radiation under conditions effective at least partially to cure the one or more colored radiation curable ink formulations.

The radiation curable ink formulations of the present invention which contain rheology modifiers have the advantage of permitting clean doctoring. When used with black pigments to produce a raised black matrix surface pattern on a transfer layer, intrusion of the black ink into the areas occupied by colored inks is minimal, thus producing flat panel color filters with reduced haze when compared to previously-known flat panel color filters. The radiation curable formulations of the present invention containing 2-benzyl-2-dimethylamino-1-(4-morpholinophenyl)-butan-1-one and chloropropoxythioxanthone have the advantage of exceptionally fast cure rates, particularly for black inks having optical densities greater than 2.0.

DETAILED DESCRIPTION OF THE INVENTION

Figure 1:
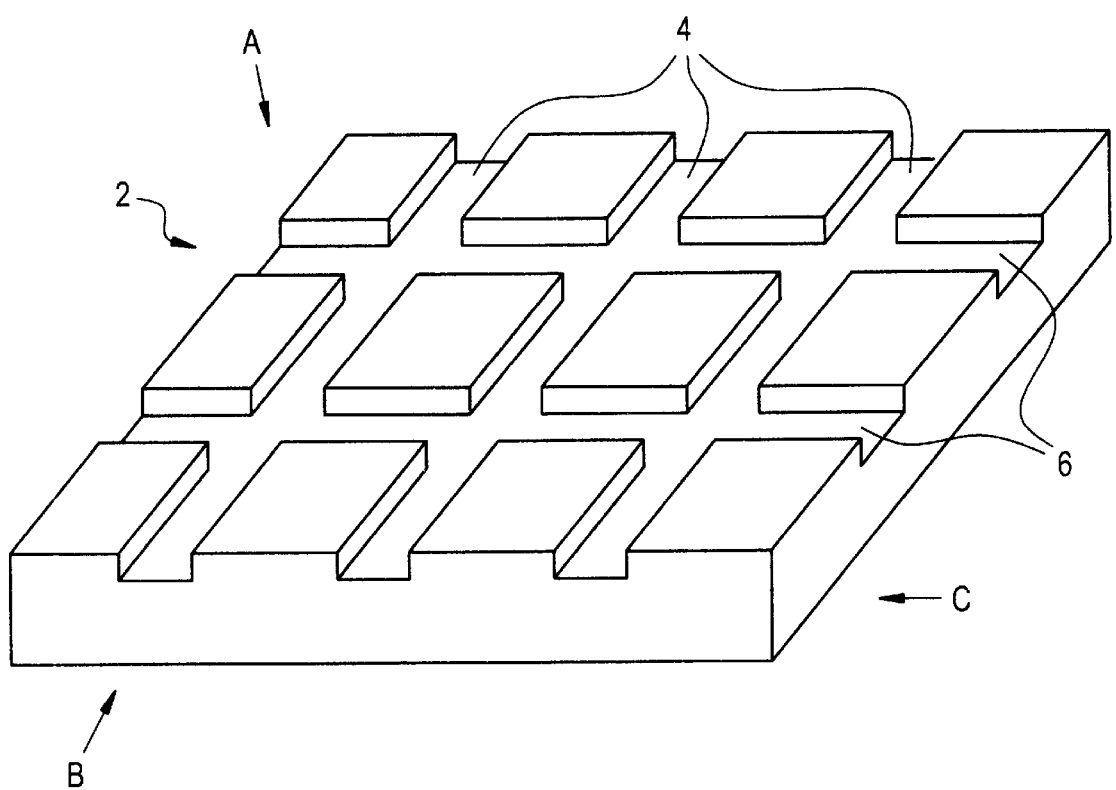
FIG. 1 is a perspective view of a preferred recessed pattern for use in the practice of a preferred embodiment of the present invention.

The present invention relates to a radiation curable ink formulation. The radiation curable ink formulation includes a pigment, a radiation cross-linkable monomer or oligomer, and a rheology modifier.

A variety of cross-linkable monomers or oligomers can be used in the radiation curable ink formulation of the present invention. Suitable monomers and oligomers include those of vinyl ethers, maleate/vinyl ethers, unsaturated polyesters. epoxides, acrylates, methacrylates, and malemides.

Of these, monomers or oligomers of acrylated or methacrylated acrylics, acrylated or methacrylated esters, acrylated or methacrylated urethanes and acrylated or methacrylated epoxides are particularly useful.

Acrylics for use in the formulation of the present invention can be multi-functional or mono-functional, and they are meant to include acrylates as well as methacrylates. Generally, acrylates are preferred because of their higher cure speed. Multi-functional acrylics contain two or more acrylate or methacrylate groups per molecule, preferably less than about 8 acrylate or methacrylate groups per molecule. and, more preferably, 3, 4, or 6 acrylate or methacrylate groups per molecule. In general, the molecular weight of acrylate or methacrylate monomers or oligomers is between about 100 and about 5000. Preferably, the molecular weight is lower than about 2000.

Suitable multi-functional acrylate or methacrylate compounds include acrylate or methacrylate esters of aliphatic polyhydroxy compounds, such as, for example trimethylolpropane triacrylate; triacrylates or trimethacrylates of glycerol; triacrylates or trimethacrylates of hexane-2,4,6-triol, ethoxylated glycerol, or propoxylated glycerol; hexanediol diacrylate; 1,3-burylene glycol diacrylate; neopentyl glycol diacrylate; 1,6-hexanediol diacrylate; propoxylated neopentyl glycol diacrylate; polyethylene glycol-200 diacrylate; tetraethylene glycol diacrylate; triethylene glycol diacrylate; pentaerythritol tetraacrylate, tripropylene glycol diacrylate; ethoxylated bisphenol-A diacrylate; trimethylolpropane diacrylate; di-trimethylolpropane tetraacrylate; triacrylate of tris(hydroxyethyl) isocyanurate; dipentaerythritol hydroxypentaacrylate; pentaerythritoltriacrylate; ethoxylated trimethylolpropane triacrylate; tricyclododecanedimethanoldiacrylate; triethylene glycol dimethacrylate; ethylene glycol dimethacrylate; tetraethylene glycol dimethacrylate; polyethylene glycol-200 dimethacrylate; 1,6-hexanediol dimethacrylate; neopentyl glycol dimethacrylate; polyethylene glycol-600 dimethacrylate; 1,3-butylene glycol dimethacrylate; ethoxylated bisphenol-A dimethacrylate; trimethylolpropane trimethacrylate; diethylene glycol dimethacrylate; 1,4-butanediol diacrylate; diethylene glycol dimethacrylate; pentaerythritol tetramethacrylate; glycerin dimethacrylate; trimethylolpropane dimethacrylate; pentaerythritol trimethacrylate; pentaerthritol dimethacrylate; pentaerythritol diacrylate; and mixtures thereof.

Examples of commercial acrylics are COMPIMA-UV, SA1002, and SA2007 (manufactured by Mitsubishi Petrochemical Co.); BISCOAT 700 (manufactured by Osaka Organic Chemical Co.); R604, DPCA-20, DPCA-30, DPCA-60, DPCA-120. HX-620, D-310, and D-330 (manufactured by Nippon Kayaku Co.); and ARONIX M210, M215, M315, and M325, (manufactured by Toa Gosei Chemical Co.).

acrylate; lauryl methacrylate; octadecyl methacrylate; stearyl methacrylate; tetrahydrofurfuryl methacrylate; butoxyethyl methacrylate; ethoxydiethylene glycol methacrylate; benzyl methacrylate; cyclohexyl methacrylate; phenoxyethyl methacrylate; polyethylene glycol mono (methacrylate); polypropylene glycol mono(methacrylate); methoxyethylene glycol methacrylate; ethoxyethoxyethyl methacrylate; methoxypolyethylene glycol methacrylate; methoxypolypropylene glycol methacrylate; dicylopentadiene methacrylate; dicyclopentanyl methacrylate; dicyclopentenyl methacrylate; tricyclodecanyl methacrylate; isobornyl methacrylate; bornyl methacrylate; methacryloylmorpholine; N,N-dimethyl acrylamide; N,N-dimethylmethacrylamide; diacetone methacrylamide; isobutoxymethyl methacrylamide; t-octyl methacrylamide; and mixtures thereof.

Other acrylics that can be used in the formulations of the present invention include those having the formula:

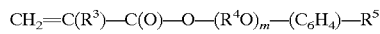

$$CH_2=C(R^3)-C(O)-O-(R^4O)_m-(C_6H_4)-R^5$$

where $R^3$ is a hydrogen atom or a methyl group; $R^4$ is an alkylene group having 2 to 6 carbon atoms; $R^5$ is a hydrogen atom or an alkyl group having 1 to 12 carbon atoms; and m is an integer from 0 to 12, preferably from 1 to 8. Illustrative examples of acrylics having this formula are ethoxylated nonylphenolacrylates and propoxylated nonylphenolacrylates.

Another suitable acrylic for use in the formulations of the present invention is one having the formula:

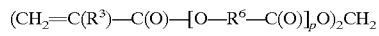

$$(CH_2=C(R^3)-C(O)-[O-R^6-C(O)]_pO)_2CH_2$$

where $R^3$ is a hydrogen atom or a methyl group; $R^6$ is an alkylene group having from 2 to 8 carbon atoms; and p is an integer from 1 to 8, preferably from 1 to 4. Yet another suitable acrylic is one having the formula:

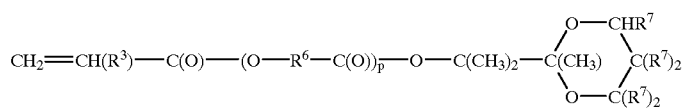

Monofunctional acrylates and methacrylates can also be used, either alone or in combination with multi-functional acrylates or methacrylates to adjust the viscosity of the composition containing the multi-functional acrylates or methacrylates. Furthermore, the mechanical properties of the radiation curable ink formulation can be modified by careful selection of the monofunctional acrylate or methacrylate. For instance, the use of lauryl acrylate results in a more flexible cured composition, whereas use of methyl methacrylate results in a harder cured composition. Examples of suitable monofunctional methacrylates include: 2-hydroxyethyl methacrylate; 2-hydroxypropyl methacrylate; 2-hydroxybutyl methacrylate; methyl methacrylate; ethyl methacrylate; propyl methacrylate; isopropyl methacrylate; butyl methacrylate; amyl methacrylate; isobutyl methacrylate; t-butyl methacrylate; pentyl methacrylate; hexyl methacrylate; heptyl methacrylate; isoamyl methacrylate; octyl methacrylate; isooctyl methacrylate; 2-ethylhexyl methacrylate; nonyl methacrylate; decyl methacrylate; isodecyl methacrylate; undecyl methacrylate; dodecyl methwhere $R^3$, $R^6$, and p are the same as above and $R^7$ is a hydrogen atom or a methyl group.

Additionally or alternatively, the monomers or oligomers used in the radiation curable ink formulations of the present invention can include vinyl ethers, such as hydroxybutyl vinyl ether lauryl vinyl ether, cetyl vinyl ether, 2-ethylhexvl vinyl ether, and the like; maleic acid esters; fumaric acid esters; or combinations thereof.

Examples of commercially available monomers or oligomers suitable for use in the formulations of the present invention include SR504A (Sartomer) ARONIX M111, M113, M114, and M117 (manufactured by Toa Gosei Chemical Co.); K-AYARAD TC110S, R629, and R644 (manufactured by Nippon Kayaku Co.); and OISSCOAT 3700 (manufactured by Osaka Organic Chemicals Co.).

Monomers or oligomers containing N-vinyl functional groups can also be used, especially in cases where enhanced cure-speed, good through cure, and low viscosity are desirable. The N-vinyl functional compounds can be mono or difunctional and include, for example, N-vinvl-pyrrolidone;

N-vinyl-caprolactam; N-vinylcarbazole; N-vinylformamide; N-vinyl-2-imidazolidone; N,N'-divinyl-2-imidazolidone; and N-vinyl-acetamide.

Other useful monomers or oligomers include amine-containing, ethylenically-unsaturated compounds, especially in cases where dispersability of the pigment is important. The ethylenic unsaturated portion of the amine-containing, ethylenically-unsaturated compound can be acrylate, methacrylate, vinyl, allyl, maleic, fumaric, and the like. Preferably, the amine group is a tertiary amine having a pKa greater than 9. Particularly useful examples of amine-containing, ethylenically-unsaturated compounds are: dimethylamino acrylate; dimethylaminoethyl methacrylate; N,N-dimethyl aminopropyl methacrylamide; diethylaminoethyl acrylate. dimethylamino-1,3-propyl acrylate; dimethylamino-1,2-propyl acrylate; phenyl-4-ethylamino-[1,4-dimethyl(cyclohexyl) acrylate; and 7-amino-3,7-dimethyloctyl methacrylate. Other examples include dimethylaminostyrene and the dimethylamine ethylylether of butanediol vinyl ether.

As indicated above, monomers or oligomers (or combinations thereof) can be employed to practice the present invention. In cases where the ink formulation is to have the preferred rheology, the use of oligomers, particularly high molecular weight oligomers is preferred. Optimal rheology is achieved by dissolving the rheology modifier in monomers which exhibit appropriate solubility parameters, preferably prior to mixing in the other components of the radiation curable ink formulation.

The radiation curable ink formulation also includes a pigment. Generally, the amount of pigment used depends on the application to which the radiation curable ink formulation is to be put. Where the radiation curable ink formulation is colored, the amount of pigments in the radiation curable ink formulation is generally effective to produce an ink formulation having an optical density (per cm) of less than about 1, preferably less than about 0.7. The lower limit of optical density is not particularly critical and, generally, is in the range of about 0.2. Typically, colored ink formulations contain from about 5 to about 25 wt. % of pigment. Black radiation curable ink formulations typically contain amounts of pigment which render them substantially opaque. Generally, the black radiation curable ink formulations have an optical density (per cm) of greater than about 3, preferably greater than about 4. This is typically achieved when the black ink formulation contains from about 10 to about 35 wt. % of black pigment. Preferably, the radiation curable ink formulation exhibits an optical density greater than about 2 from about 300 nm to about 700 nm when deposited and cured at a thickness of less than about 25 microns. More preferably, the ink formulation exhibits this optical density when it is deposited and cured at a thickness of less than about 5 microns.

Where the radiation curable ink formulation of the present invention is to be used in a flat panel color filter, the colors that are generally necessary are black (for the matrix or grid) and green, red, and blue (in the transmissive case) or yellow, magenta, and cyan (in the reflective case). The transmissive case in generally employed in AMLCDs. As used herein, pigment refers to any suitable coloring material, such as inorganic, organic, or organometallic coloring materials that are insoluble in water and common solvents.

For the black radiation curable ink formulations, such as those typically employed as matrix materials, suitable black coloring materials include C.I. pigment black 1. C.I. pigment black 7. and carbon blacks. Suitable carbon blacks include Monarch 1100, 1300, and 1400. Regal 400R, and Niogul L (from Cabot Corp.) and Color Black FW 200, 6, and Si60 and Special Black 250, 350, and 550 (from Degussa). Iron blacks and other black-colored inorganics, as well as combusted animal bones and ebony products, can also be used.

For the green colored radiation curable ink formulations, suitable pigments include Halo-Cu-phthalocyanine, C.I.-pigment green 15, 25, and 36, and combinations of these with yellow, orange, red, and/or blue pigments.

For red colored formulations, suitable coloring materials include C.I. pigment Red Nos. 105, 149, 176, 177, combinations thereof, and combinations thereof with C.I. pigment violet 14 and/or 29, pigment orange 43, and/or yellow pigments, if needed to achieve the desired color.

For the blue colored formulations, suitable coloring materials include C.I. pigment Blue 15, 15:3, 15:6, 22 and 28, optionally combined with other pigments.

The radiation curable ink formulation of the present invention further includes a rheology modifier. The rheology modifier is chosen so that the radiation curable ink formulation has a tan $\delta$ of from about 0.5 to about 1.5. Preferably, tan $\delta$ is between about 0.75 and about 1; more preferably, it is between about 0.9 and about 1; and, most preferably, it is about 1.

As one skilled in the art will note, tan $\delta$ is simply the ratio of plastic modulus to elastic modulus, or, expressed differently, tan $\delta$=plastic modulus/elastic modulus. Sometimes, it is expressed as loss/storage or as viscous modulus/elastic modulus. Tan $\delta$ is a universal measure of viscoelasticity of a body that is semi-solid (or semi-liquid). A pure solid would be a perfect elastic (i.e., tan $\delta$ would be 0), whereas a pure liquid would be a perfectly viscous (i.e., tan $\delta$ would be infinite). Therefore, tan $\delta$ is a convenient quantifier for viscoelasticity. Tan $\delta$ of a sample is measured by imposing a sinusoidal strain (or stress) on the sample while the responding stress (or strain) is monitored. As liquid is sheared (or a solid is deformed), part of the strain is recovered after the stress is removed. The phase lag between stress and strain, $\delta$, is directly measured. The tangent of this phase lag between stress and strain, $\delta$, is tan $\delta$. Oscillation frequency is taken as the "shear rate", and, therefore, viscoelasticity as a function of shear rate can be elucidated in one frequency sweep.

Suitable rheology modifiers for use in the practice of the present invention include cellulosic materials and, such as cellulosic ethers and esters, examples of which include ethyl cellulose, cellulose acetate butyrate, and other cellulose based compounds commonly employ ed as thickeners in inks and paints. Preferably, the rheology modifier is functionalized to react with the monomer or oligomer contained in the radiation curable ink formulation. Suitable functionalized cellulosic materials also include those containing one or more ethylenically unsaturated groups, such as vinyl groups or acrylic groups. Cellulosic-acrylate materials (e.g., cellulosic materials functionalized with acrylate or methacrylate groups) are particularly suitable for use in the radiation curable ink formulations of the present invention. These materials can be prepared by mixing cellulose ethers with an acid catalyst and metholoyl acrylamide. Further details for their preparation can be found in U.S. Pat. No. 4,060,506 to Verbanac, U.S. Pat. No. 4,060,506 to Young et al., and U.S. Pat. No. 4,060,506 to Young et al., which are hereby incorporated by reference. Particularly preferred cellulosic-acrylate materials are the acrylamide-functionalized cellulosic ethers, which can be obtained commercially as Jaylink 106E, Jaylink 105C, and Jaylink 102M from Bomar Specialties Co. (Winsted, Conn.). The molecular weight (number average) of the functionalized cellulosic material is preferably from about 10,000 to about 50,000. In addition to using the above-described functionalized cellulosic materials, non-functionalized cellulosic materials can also be employed, such as acetate, propionate, or butyrate esterified cellulosic polymers.

The amount of rheology modifier, such as functionalized cellulosic material, present in the radiation curable ink formulation of the present invention can range from about 2 to about 20% by weight, preferably, from about 5 to about 15% by weight, and, more preferably, from about 8 to about 15%, by weight. A variety of factors influence the optimal level of rheology modifier. These include the amount and type of pigment employed and the solubility of the rheology modifier in the monomers and oligomers contained in the radiation curable ink formulation. Generally, optimal levels of rheology modifier are ascertained by experimentally determining the levels which produce clearly doctoring radiation curable ink formulations.

The cure time of the radiation curable ink formulation of the present invention can be adjusted by including therein a photopolymerization initiator, a photosensitizing agent, or both.

Examples of suitable photopolymerization initiators include: 1-hydroxycyclohexylphenyl ketone; 2,2-dimethoxy-2-phenylacetophenone; xanthone; fluorenone; benzaldehyde; fluorene; anthraquinone; tripehnylamne; carbazole; 3-methylacetophenone; 4-chlorobenzophenone; 4,4-dimethoxybenzophenone; 4,4'-diaminobenzophenone; Michler's ketone; benzoin propel ether; benzoin ethyl ether; benzyldimethylketal, 1-(4-isopropyl-phenol)-2-hydroxy-2-methylpropane-1-on; 2-hydroxy-2-methyl-1-phenylpropene-1-on; thioxanthone; diethylthioxanthone; 2-isopropylthioxanthone; 2-chlorothioxanthone; 2-methyl-1-[4-methylthio)phenyl]-2-morpholinopropane-1-on; 2,4,6-trimethylbenzoyl diphenyl phosphine oxide; and commercial products, such as Irgacure 184, 651, 500, and 907 and CG 24–61 (all manufactured by Ciba Geigy); Lucirin TPO and Lucirin LR 8728 (manufactured by BASF); Darocure 1116 and 1173 (manufactured by Merck); and Ubecryl-P36 (manufactured by the UCB Co.).

Examples of suitable photosensitization agents include: chloropropoxythioxanthone (available from Great Lakes Fine Chemicals, Ltd., Cheshire, England under name Quantacure CPTX); triethylamine; diethylamine; N-methyldiethanolamine; ethanolamine; 4-dimethvlaminobenzoic acid; 4-dimethylaminomethyl benzoate; 4-dimethylaminoethyl benzoate; 4-dimethylaminoisoamyl benzoate; and commercial products, such as Ubecryl-P102, 103, 104, and 105 (manufactured by the UCB Co.).

The combination of chloropropoxythioxanthone and one or more photoinitiators selected from the group consisting of 2-benzyl-2-dimethylamino-1-(4-morpholinophenyl)-butan-1-one (manufactured by Ciba Geigy under name Irgacure 369), 2,4,6-trimethylbenzoyl diphenyl phosphine oxide (manufactured by BASF under the name Lucirin TPO), and bis(2,4,6-trimethylbenzoyl) phenyl phosphine oxide (manufactured by BASF under the name BAPO), has been found to be particularly effective.

The polymerization initiators and photosensitization agents can be present individually or in mixtures of two or more. In applications where it is desirable to have the radiation cross-linkable ink formulation of the present invention curable by both heat and ultraviolet light, the above photopolymerization initiators can be used in combination with heat sensitive radical initiators. The amount of polymerization initiator used is preferably from about 0.5 to about 15, more preferably from about 2 to about 10, and most preferably from about 2 to about 5 wt. % of the formulation. Typical amounts of spectral sensitizer range from about 0.1 to about 15, preferably from about 0.2 to about 5, and more preferably From about 0.2 to about 2 wt. % of the formulation.

In addition to the above described components, the radiation curable ink formulation of the present invention can include other additives. For example, the formulation can contain dispersing agents, such as, for example, Solsperse 24000 or Solsperse 5000 (from Zeneca), Sarbox resins (from Sartomer), Ganex V-516 (from GAF), Nopcogen 22-O (from Henkel), and the like.

The radiation curable ink formulation of the present invention can further include other types of additives, such as antioxidants, ultraviolet absorbers, photostabilizers, silane coupling agents, heat and/or polymerization inhibitors, leveling agents, surfactants, preservatives, plasticizers, lubricants, fillers, aging inhibitors, wetting agents, coating surface improvers, and the like. Commercial antioxidants which can be used are Irganox 1010, 1035, 1076, and 1222 (manufactured by Ciba Geigy), and the like. Examples of commercial ultraviolet absorbers are Tinuvin P234, 320, 326, 327, 238, and 213 (manufactured by Ciba Geigy) and Sumisorb 110, 130, and 200 (manufactured by Sumitomo Chemical Co.). Commercial photostabilizers which can be used include Tinuvin 292, 144, and 622LD (manufactured by Ciba Geigy) and Sanol LS770 (manufactured by Sankyo Chemical Co.). Suitable silane coupling agents include t-aminopropyltriethoxy silane and commercial products, such as SH6062 and SH6030 (manufactured by Toray Silicone Co.) and KBE 903, 603, and 403 (manufactured by Shin-Etsu Chemical Co.).

The radiation curable ink formulation of the present invention can be prepared by mixing the above components using conventional polymer and monomer mixing methods. Generally, the mixing should be carried out in the absence of the radiation which cross-links the radiation curable ink formulation. In cases where the monomers and oligomers are heat curable or where the formulation contains a thermal polymerization initiator, the mixing is preferably carried out at low temperatures. As one skilled in the art will recognize, it is generally preferred that the pigment be finely ground prior to addition to the mixture and, more preferably, that it be dispersed in a suitable dispersing medium and then blended, in dispersed form, into the mixture.

A preferred black radiation curable ink formulation according to the present invention contains, in weight percent, 23.7% Regal R400 (a carbon black manufactured by Cabot Corporation, Billerica, Mass.), 9.4% SR 497 (a N-vinyl formamide manufactured by Sartomer Corporation, Exton, Pa.). 23.7% SR 247 (a neopentylglycol diacrylate manufactured by Sartomer Corporation, Exton, Pa.), 9.4% SR 248 (a neopentylglycol dimethacrylate manufactured by Sartomer Corporation, Exton, Pa.), 9.4% OTA 480 (an acrylated trifunctional monomer based on a glycerol derivative, available from UCB Radcure. Inc., Atlanta, Ga.), 4.7% Solsperse 24000 (a dispersant manufactured by Zeneca, Inc., Wilmington, Del.), 15% Jaylink 106E (an acrylamide functionalized cellulosic ether manufactured by Bomar Specialties Co., Winsted, Conn.), 2.8% Lucirin TPO (a 2,4,6-trimethylbenzoyl diphenyl phosphine oxide photoinitiator manufactured by BASF, Parsippany, N.J.), 1.4% Irgacure 369 (a 2-benzyl-2-dimethylamino-1-(4-morpholinophenyl)-butan-1-one photoinitiator manufactured by Ciba Geigy, Tarrytown, N.Y.), 0.5% Quantacure CPTX (a chloropropoxythioxanthone spectral sensitizer, available from Great Lakes Fine Chemicals, Ltd., Cheshire, England), Moldwiz 1285N (an internal release agent made by condensation of synthetic resins, glycerides, and organic acid derivatives and dissolution in an organic solvent, manufactured by Axel Plastics Research Laboratories, Inc., Woodside, N.Y.), 34.2% hexyl acetate, and 8.6% n-hexanol.

The present invention, in another aspect thereof, relates to radiation curable formulations which include the following: a radiation cross-linkable monomer or oligomer; a photoinitiator selected from the group consisting of 2-benzyl-2-dimethylamino-1-(4-morpholinophenyl)-butan-1-one, 2,4,6-trimethylbenzoyl diphenyl phosphine oxide, bis(2,4,6-trimethylbenzoyl) phenyl phosphine oxide, and combinations thereof, and chloropropoxythioxanthone (e.g., 1-chloro-4-propoxythioxanthone). Suitable radiation cross-linkable monomers and oligomers include those described above with regard to the radiation curable ink formulations of the present invention. The preparation of chloropropoxythioxanthone is described in U.S. Pat. No. 5,414,092 to Green et al., which is hereby incorporated by reference, and 2-benzyl-2-dimethylamino-1-(4-morpholinophenyl)-butan-1-one can be prepared by analogous methods.

The combination of chloropropoxythioxanthone and one or more preferred photoinitiators selected from the group consisting of 2-benzyl-2-dimethylamino-1-(4-morpholinophenyl)-butan-1-one, 2,4,6-trimethylbenzoyl diphenyl phosphine oxide, and bis(2,4,6-trimethylbenzoyl) phenyl phosphine oxide results in the radiation cross-linkable monomers and oligomers being cured at exceptionally high rates. Although not critical to the practice of the present invention, the weight ratio of chloropropoxythioxanthone to preferred photoinitiator is, preferably, from about 0.1 to about 1. The radiation curable formulation can also include other components, the choice of which, as one skilled in the art would recognize, depends on the use to which the formulation is to be put. Illustratively, these other components include other photoinitiators and or photosensitizers, coloring agents, dispersants, antioxidants, ultraviolet absorbers, photostabilizers, silane coupling agents, heat and/or polymerization inhibitors, leveling agents, surfactants, preservatives, plasticizers, lubricants, fillers, aging inhibitors, wetting agents, and coating surface improvers, examples of which include those discussed above. The ratio of the weight of the chloropropoxythioxanthone/preferred photoinitiator combination to the weight of the radiation curable formulation (i.e., the sum of the weights of chloropropoxythioxanthone, the preferred photoinitiator or preferred photoinitiator combination, radiation cross-linkable monomers and oligomers, and all other components in the formulation) is preferably from about 0.005 to about 0.10 (i.e., from about 0.5% to about 10%).

For example, the radiation curable formulation can include a black pigment. Such a formulation is suitable for use as a black radiation curable ink formulation in, for example, flat panel color filters. Alternatively, by incorporating colored inks into the radiation curable formulation of the present invention, colored radiation curable ink formulations can be produced. These colored ink formulations can also be used, for example, in flat panel color filters.

The present invention also relates to a flat panel color filter. The flat panel color filter includes a substrate on which is disposed a black radiation curable ink formulation. The black radiation curable ink formulation forms a pattern of raised grid elements on the substrate, and, between the raised grid elements, is disposed one or more colored radiation curable ink formulations.

At least one of the radiation curable ink formulations (i.e., at least one of the black radiation curable ink formulation and the colored radiation curable ink formulations) has a tan δ of from about 0.5 to about 1.5 and includes a pigment, a radiation cross-linkable monomer or oligomer, and a rheology modifier. In cases where only one of the radiation curable ink formulations contains a rheology modifier, the radiation curable ink formulation containing the rheology modifier can be the black radiation curable ink formulation or one of the colored radiation curable ink formulations. Alternatively, the black and some, but not all, of the colored radiation curable ink formulations can contain the rheology modifier. Still alternatively, some or all of the colored radiation curable ink formulations can contain the rheology modifier, while the black radiation curable ink formulation does not. Flat panel color displays where the black and all of the colored radiation curable ink formulations contain rheology modifier are also encompassed by the present invention. In a preferred embodiment, the black radiation curable ink formulation has a tan δ of from about 0.5 to about 1.5 and includes a black pigment, a radiation cross linkable monomer or oligomer, and a rheology modifier. Radiation curable ink formulations suitable for use in the flat panel color filter of the present invention include those radiation curable ink formulations that are described above.

Alternatively or additionally, at least one of the radiation curable ink formulations (i.e., at least one of the black radiation curable ink formulation and the colored radiation curable ink formulations) can include a pigment, a radiation cross-linkable monomer or oligomer, 2-benzyl-2-dimethylamino-1-(4-morpholinophenyl)-butan-1-one, and chloropropoxythioxanthone. For example, all, all of the colored but not the black, some of the colored but not the black, some of the colored and the black, or just the black radiation curable ink formulations can contain the 2-benzyl-2-dimethylamino-1-(4-morpholinophenyl)-butan-1-one/ chloropropoxy, thioxanthone combination.

Radiation curable ink formulations suitable for use in the flat panel color filter of the present invention include those radiation curable ink formulations that are described above.

The pattern of black raised grid elements can have any desired design. One typical pattern of black raised grid elements consists of elongated black lines which criss-cross one another to form rectangular spaces, within which the colored radiation curable inks are located. Such patterns of black raised grid elements can also include smaller black rectangles located along the grid cell edges which correspond to the thin film transistor ("TFT") location on the opposite glass panel in the liquid crystal or other flat panel color filter display.

Because of the stringent registration requirements, the pattern of black raised grid elements is preferably formed so that, for a black raised grid pattern having the typical rectangular sub-pixel grid pattern, when looking down at the color filter, only sharp, well defined edges are seen on the black raised grid pattern. The corners and intersections of grids in such black raised grid patterns should be perpendicular, so that, when looking down at the color filter, only square edges are visible. The cross-sectional shape of the grids which make up such a black raised grid pattern is preferably rectangular with square, crisp edges (rather than semi-circular or triangular).

Typically, flat panel color filter displays require approximately 15–40 micron width black grid lines which are less than 5 microns, preferably less than 2 microns, thick and discrete regions of colored radiation curable ink formulations which are typically on the order of about 70–100 microns in width by 200 to 300 microns in length. The thickness of the discrete regions of colored radiation curable ink formulations are typically less than about 10 microns, and preferably less than about 5 microns. The one or more colored radiation curable ink formulations which is disposed on the substrate between the raised grid elements preferably has the same thickness as the raised grid elements so that a flat surface is presented by the raised grid pattern and the colored radiation curable ink formulations disposed within the raised pattern.

In cases where the black radiation curable ink formulation has a tan δ of from about 0.5 to about 1.5, the one or more colored radiation curable ink formulations can, optionally, have a tan δ of from about 0.5 to about 1.5 and contain rheology modifiers, such as the above-described functionalized cellulosic materials. The specific rheology modifier used for the colored radiation curable ink formulations can, but need not be, the same as the one used in the black radiation curable ink formulation. Generally, the one or more colored radiation curable ink formulations will be formulated to have a tan δ of from about 0.5 to about 1.5 only when they are to be doctored, such as on a gravure or intaglio surface. Regardless of whether the inks are deposited by methods which involve doctoring or by methods which do not involve doctoring (such as typographic ink or ink jet printing techniques) it is preferred that the colored radiation curable ink formulations contain the combination of chloropropoxythioxanthone and one or more photointiators selected from the group consisting of 2-benzyl-2-dimethylamino-1-(4-morpholinophenyl)-butan-1-one, 2,4,6-trimethylbenzoyl diphenyl phosphine oxide, and bis(2,4,6-trimethylbenzoyl) phenyl phosphine oxide.

The substrate used in the flat panel color filter of the present invention can be a permanent substrate, such as glass, onto which the raised grid pattern and colored radiation curable ink formulations are permanently disposed or, alternatively, it can be a temporary transfer layer which, in the normal course of flat panel color filter manufacture, is ultimately transferred to a permanent substrate.

When the substrate is a transfer layer, the transfer layer may be formed using, for example, polyimides, epoxies, acrylics, vinyl ethers, polyurethanes, polyesters, and acrylated or methacrylated acrylics, esters, urethanes, or epoxides, and other materials which are conventionally useful as planarizing layers in conventional color filter devices. A preferred material for the transfer layer is a radiation curable acrylate material, such as a radiation curable epoxy acrylate. Typically, the transfer layer is a thin film, typically less than 10 microns. Preferably, the transfer layer is formed of a radiation curable material to facilitate curing.

The present invention also relates to a method for producing a flat panel color filter. The method includes depositing a black radiation curable ink formulation onto a first portion of a substrate in a grid pattern. The method further includes depositing one or more colored radiation curable ink formulations on a second portion of the substrate. The first and second portions of the transfer layer are distinct. At least one of the black radiation curable ink formulation and the colored radiation curable ink formulations has a tan δ of from about 0.5 to about 1.5 and includes a pigment, a radiation cross-linkable monomer or oligomer, and a rheology modifier, or, alternatively, at least one of the black radiation curable ink formulation and the colored radiation curable ink formulations includes the following: a radiation cross-linkable monomer or oligomer; a photoinitiator selected from the group consisting of 2-benzyl-2-dimethylamino-1-(4-morpholinophenyl)-butan-1-one, 2,4,6-trimethylbenzoyl diphenyl phosphine oxide, bis(2,4,6-trimethylbenzoyl) phenyl phosphine oxide, and combinations thereof; and chloropropoxythioxanthone. The method also includes exposing the black radiation curable ink formulation to actinic radiation under conditions effective at least partially to cure the black radiation curable ink formulation and exposing the one or more colored radiation curable ink formulations to actinic radiation under conditions effective at least partially to cure the one or more colored radiation curable ink formulations.

The method by which the black radiation curable ink formulation and the colored radiation curable ink formulation or formulations is deposited on the substrate is not particularly critical to the practice of the present invention. Neither is the order in which the black and colored radiation curable ink formulations are deposited, though deposition of the black radiation curable ink formulation first is particularly preferred. The substrate on which the formulations are deposited can be a permanent substrate (i.e., a substrate which appears in the finished flat panel color fitter) or it can be a temporary substrate (i.e., a substrate from which the various formulations are transferred, directly or indirectly, to a second, permanent substrate). In the latter case, the substrate is typically referred to as a transfer layer. By contacting at least one of the black radiation curable ink formulation and the colored radiation curable ink formulations with a second substrate, the one or more of the black radiation curable ink formulation and the colored radiation curable ink formulations can be transferred From the transfer layer to the second substrate. It should be noted that the transfer layers need not be temporary and can be present in the final product, for example, as one of the layers which, together with a second (permanent) substrate, sandwich the radiation curable ink formulations deposited on the transfer layer.

One particularly preferred method according to the present invention is set forth below.

Briefly, a black radiation curable ink formulation having a tan δ between about 0.5 and about 1.5 and comprising a black pigment, a radiation cross-linkable monomer or oligomer, and a rheology modifier, is disposed into recesses of a patterning surface. Typically, the surface is then doctored, leaving ink only in the recesses. The black radiation curable ink formulation is transferred from the patterning surface's recesses to a substrate (e.g., a transfer layer) under conditions effective to form a raised black matrix surface pattern and a recessed surface pattern on the substrate. As one skilled in the art will recognize, the raised black matrix surface pattern, by definition, covers the first portion of the substrate (e.g., the transfer layer), and the portion of the substrate not covered with the raised black matrix surface pattern is, by definition, the recessed surface pattern. One or more colored ink patterns can then deposited on the transfer layer within the recessed surface pattern. The raised black matrix surface pattern and the one or more colored ink patterns can then be contacted with a second substrate under conditions effective to transfer the raised black matrix surface pattern and the one or more colored ink patterns to the second substrate.

The patterning surface's recesses into which the black radiation curable ink formulation is disposed can be formed into any suitable material, preferably one that is durable and capable of withstanding repeated cycles of disposing and transferring, such as ones made of metal or fused silica. The patterning surface's recesses can be formed into a planar material or a material of any suitable geometry. Preferably, for continuous production runs, the patterning surface's recesses are formed into the surface of a cylinder, such as an intaglio roller. The particular pattern to be employed is not critical to the practice of the present invention. However, as illustrated in FIG. 1, it is preferred that pattern 2 of the patterning surface's recesses be comprised of a series of parallel lines 4 and antiparallel lines 6 intersecting at substantially right angles to one another when viewed in a direction designated by arrow A. The lines are preferably evenly spaced from one another having a center-to-center distance of from about 60 microns to about 200 microns and a width of from about 5 microns to about 40 microns. The depth of the recesses is likewise not critical to the practice of the present invention, but should equal the height of the raised black matrix surface pattern to be formed on the substrate.

By raised black matrix pattern, it is meant that the upper surface of the black matrix pattern is above the upper surface of the substrate (e.g., a transfer layer). Preferably, the black matrix pattern has a height (or thickness) of from about 1 to about 10 microns, more preferably from about 2 to about 6 microns, and most preferably from about 3 to about 4 microns. Accordingly, the depth of the patterning surface's recesses is preferably from about 1 to about 10 microns, more preferably from about 2 to about 6 microns, and most preferably from about 3 to about 4 microns. To attain a high definition black matrix pattern, it is desirable that the raised black matrix pattern have approximately vertical sides (as opposed to sloping sides or curved sides). Sides which slope very slightly can be advantageous in some circumstances, because they facilitate release. Accordingly, it is preferred that the patterning surface's recesses be of a generally rectangular or square cross section, rather than triangular or semi-circular cross section, when viewed in the directions designated by arrows B and C in FIG. 1.

Figure 2:
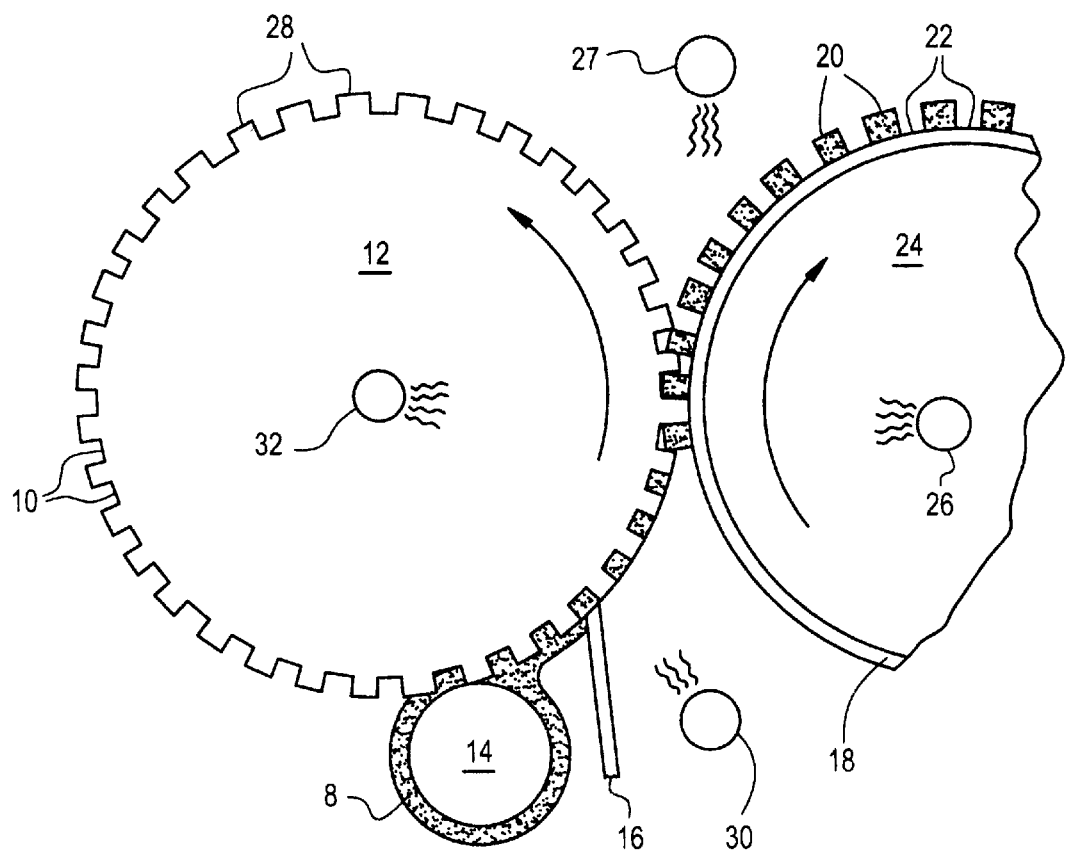
FIG. 2 illustrates an apparatus for forming a raised black matrix pattern in accordance with a method of the present invention.

FIG. 2 illustrates a preferred embodiment of this method. Black radiation curable ink formulation 8 is deposited into recessed pattern 10 of intaglio roller 12. The deposition can be carried out using any suitable process. For example, black radiation curable ink formulation 8 can be deposited into recessed pattern 10 of intaglio roller 12 by using inking roller 14. Typically, excess black radiation curable ink formulation 8 is removed from the surface of intaglio roller 12, such as by using doctor blade 16. Black radiation curable ink formulation 8 is then transferred from recessed pattern 10 to a substrate, such as transfer layer 18, under conditions effecting to form raised black matrix surface pattern 20 and a recessed surface pattern 22 on the surface of transfer layer 18. To ensure that black radiation curable ink formulation 8 retains the shape of recessed pattern 10, it is preferred that black radiation curable ink formulation 8 be cured or otherwise hardened to at least some extent, such as by exposure to actinic radiation, within recessed pattern 10 prior to or simultaneous with its transfer to transfer layer 18. Transfer layer 18 can be conveniently provided on collector roll 24, using, for example, ink-type application rollers. Transfer layer 18 is preferably liquid prior to its contact with black radiation curable ink formulation 8 and is cured during the transfer of black radiation curable ink formulation 8 to transfer layer 18. Such curing may be accomplished by using a radiation curable material to form transfer layer 18 and applying radiation, such as ultraviolet light, from radiation source 26 to transfer layer 18 during transfer of black radiation curable ink formulation 8 to transfer layer 18. Radiation source 26 is can be mounted within collector roll 24, in which case collector roll 24 is made of a material transparent to the radiation emitted from radiation source 26. Suitable types of radiation which can be employed in this regard include ultraviolet visible, infrared, or other radiation, depending on the photoinitiator employed in transfer layer 18. The radiation can also be an electron beam. However, since the electron beam has a limited penetration depth through solids, its must be aimed at the nip, as shown by electron beam source 27 in FIG. 2. Alternatively, electron beam can be used to partially cure the black radiation curable ink formulation prior to its coming into contact with the collector roll, as illustrated by the placement of radiation source 30.

Preferably, black radiation curable ink formulation 8 has a tan δ of from about 0.5 to about 1.5 and includes a black pigment, a radiation cross-linkable monomer or oligomer, and a rheology modifier and, most preferably also contains 2-benzyl-2-dimethylamino-1-(4-morpholinophenyl)-butan-1-one and chloropropoxythioxanthone. Suitable rheology modifiers include those discussed above and, particularly, include cellulosic materials functionalized to react with the monomers or oligomers contained therein (such as acrylated cellulosic materials. e.g., Jaylink 106E). When doctored, black radiation curable ink formulation 8 having tan δ of from about 0.5 to about 1.5 is cleanly removed from raised surfaces 28 of intaglio roller 12, leaving black radiation curable ink formulation 8 only in recessed pattern 10. As a result, substantially no black radiation curable ink formulation 8 is dragged onto or remains on raised surfaces 28 of intaglio roller 12.

As indicated above, it is preferred that black radiation curable ink formulation 8 be cured or otherwise hardened to at least some extent within recessed pattern 10 to ensure that black radiation curable ink formulation 8 retains the shape of recessed pattern 10. Curing or hardening of black radiation curable ink formulation 8 can be carried out in a number of ways. In a preferred embodiment, intaglio roll 12 is constructed of a radiation transparent material, and radiation source 32 is mounted therein to cure or partially cure black radiation curable ink formulation 8 while it is retained within recessed pattern 10. Such curing or setting of the black radiation curable ink formulation 8 could, alternatively, take place simultaneously with contact of black radiation curable ink formulation 8 with transfer layer 18 (i.e., at what is commonly referred to as the contact region of intaglio roller 12 and collector roll 24). In yet another method, black radiation curable ink formulation 8 can be cured by radiation from radiation source 26, assuming that transfer layer 18 and collector roll 24 are made of materials transparent to the radiation being employed. Alternatively, black radiation curable ink formulation 8 can be cured or set within recessed pattern 10 by exposure to radiation from radiation source 30 prior to its coming into contact with transfer layer 18 on collector roll 24.

When cured or hardened, black radiation curable ink formulation 8 substantially retains or, preferably, completely retains the exact shape of recessed pattern 10. During the contacting of intaglio roller 12 with transfer layer 18, the cured or otherwise hardened black radiation curable ink formulation 8 is transferred from recessed pattern 10 of intaglio roller 12 to transfer layer 18 on collector roll 24.

It is important that the surface of intaglio roll 12 be more releasing than the surface of collector roll 24. Transfer layer 18 is preferably smooth and preferably liquid prior to receiving black radiation curable ink formulation 8. This is particularly true when black radiation curable ink formulation 8 has a negative meniscus (i.e., when the surface of black radiation curable ink formulation 8 in recessed pattern 10 of intaglio roll 12 curves below raised surfaces 28 of intaglio roller 12). In this case, transfer layer 18 should be liquid or sufficiently soft and tacky to contact and adhere to black radiation curable ink formulation 8 and remove black radiation curable ink formulation 8 from recessed pattern 10 of intaglio roll 12. During contact, transfer layer 18 is cured, such as by exposure to radiation source 26, 27, or 32.

Figure 3:
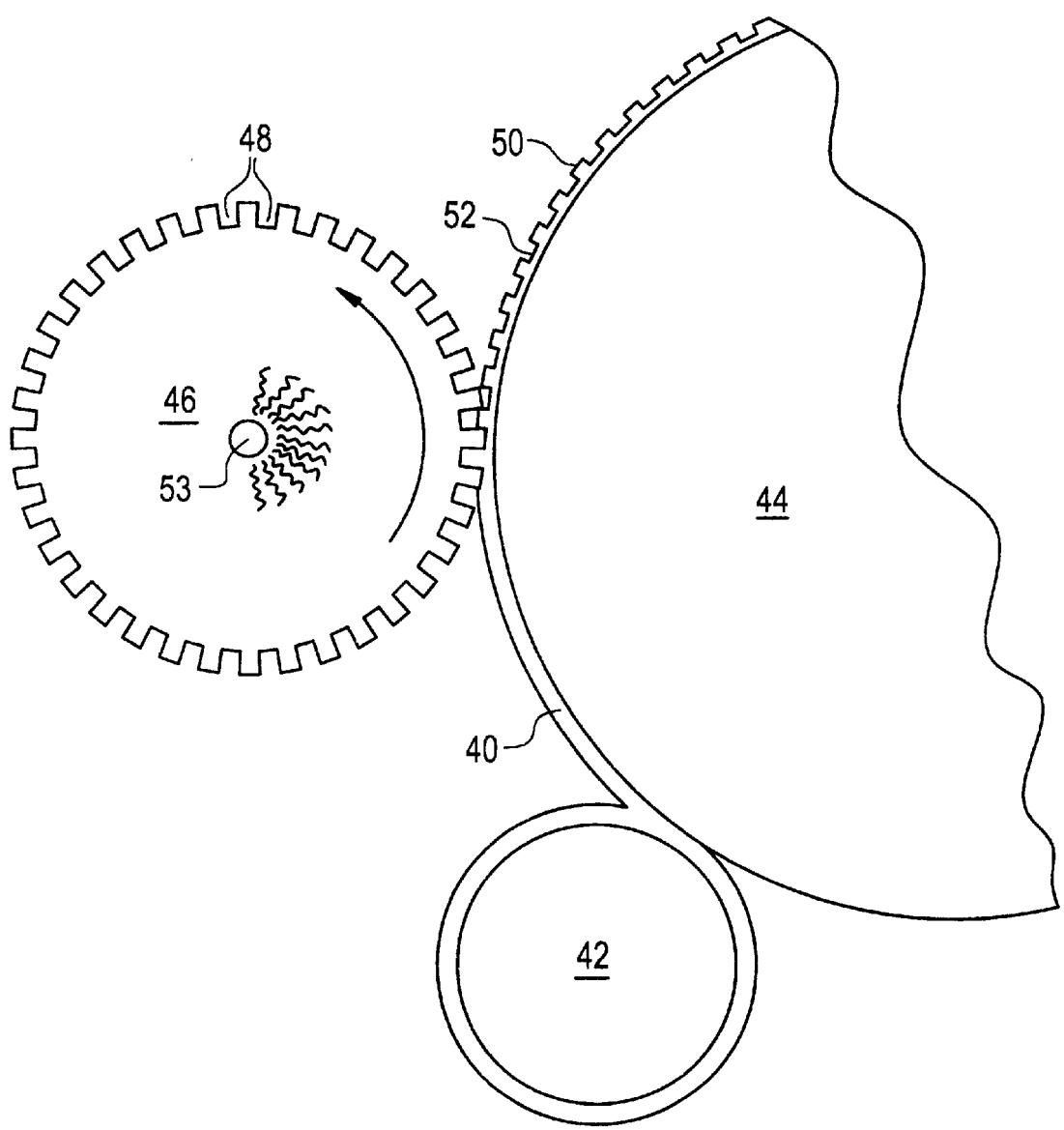
FIG. 3 illustrates a process for forming a raised pattern transfer used in making a flat panel color filter in accordance with the present invention.

Although the method illustrated in FIG. 2 is particularly well suited for black radiation curable irks of the present invention which contain rheology modifiers, the photoinitiator blend (i.e., the combination of chloropropoxythioxanthone and one or more photointiators selected from the group consisting of 2-benzyl-2-dimethylamino-1-(4-morpholinophenyl)-butan-1-one, 2,4,6-trimethylbenzoyl diphenyl phosphine oxide, and bis(2,4,6-trimethylbenzoyl) phenyl phosphine oxide), can also be used in processes which do not require doctoring. One such process is illustrated in FIG. 3. In FIG. 3, the material used to form transfer layer 40 is transferred from transfer layer applicator roll 42 onto collector roll 44. Embossing roll 46 has a recessed pattern 48 thereon corresponding to a desired raised surface pattern 50 to be impaired to transfer layer 40. Transfer layer 40 can be composed of a radiation curable material, and cured via UV light 53 which is emitted through embossing roll 46 during transfer to collector roll 44, to thereby solidify the transfer layer 40. Consequently, recessed pattern 48 on embossing roll 46 is imparted to the transfer layer 40 to form desired raised surface pattern 50 on transfer layer 40. Raised surface pattern 50 defines recessed regions 52 between the raised portions of raised surface pattern 50. Of course, alternative methods could be used to form the raised surface pattern 50. For example, a flat intaglio plate can be substituted for embossing roll 46, and the material used to form transfer layer 40 is flooded or dectored over the flat intaglio plate, after which transfer of the raised surface pattern 50 to collector roll 44 is achieved in the same manner, i.e., by employing a radiation source behind a flat transparent intaglio plate and curing transfer layer 40 through the plate during, transfer to collector roll 44.

Figure 4:
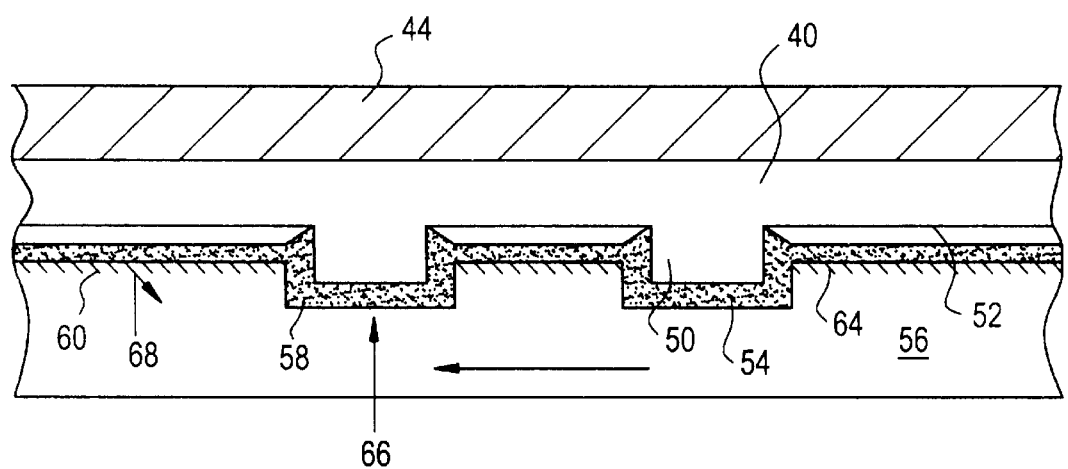
FIG. 4 illustrates a process for depositing a black radiation curable ink formulation on the raised pattern transfer layer formed by the process illustrated in FIG. 3 to produce a flat panel color filter in accordance with the present invention.

After formation of raised surface pattern 50 on transfer layer 40, as illustrated in FIG. 3, a black radiation curable ink formulation is deposited onto raised surface pattern 50 of transfer layer 40. In FIG. 4, black radiation curable ink formulation 54 is retained in the recesses of intaglio plate 56. This is achieves by contacting intaglio plate 56 with an inking roll and then doctoring off excess black radiation curable ink formulation 54 or, alternatively, by coating intaglio plate 56 with a thin layer of the black radiation curable ink formulation to fill the recesses. Raised surface pattern 50 of transfer layer 40 are inserted into the recesses 58 of intaglio plate 56 and, thereby, into contacting relationship with black radiation curable ink formulation 54. As illustrated in FIG. 4, residual portion 60 of black radiation curable ink formulation 54 sometimes remains between the recesses 58 of the intaglio plate 56, even after doctoring. However, using the method described here, contact in the recessed regions 52 between the raised portions of raised surface pattern 50 and black radiation curable ink formulation 54 on intaglio plate 56 is minimized or eliminated. Consequently, black radiation curable ink formulation 54 is transferred only to the raised portions of raised surface pattern 50 of the transfer layer 40, and the residual portion 60 of black radiation curable ink formulation 54 left by the doctoring process is not transferred to the transfer layer.

Collector roll 44 can include a cushioning or elastomeric material (e.g., butyl rubber, silicone, or polyurethane) to provide a cushioning effect to the printing process. This cushioning layer can be covered with a higher modulus layer (e.g., polyethylene terephthalate, metal foil, or a combination thereof). For example, a cushioning layer of polyurethane which is 0.25 inches thick can be covered with a nickel or steel metal foil between 0.003 and 0.006 inches thick. Optionally, a polyethylene terephthalate layer can be coated on this metal foil, and a hardcoating material, such as an $SiO_2$ or diamond-like carbon coating of about 0.005 inches thick, can be deposited on top of the polyethylene terephthalate layer. The transfer layer is then deposited directly onto this coated polyethylene terephthalate surface. Such coatings could be deposited, for example, by vapor deposition techniques. Such collectors are further described in U.S. patent application Ser. No. 08/675,359, filed Jul. 2, 1996, the specification of which is hereby incorporated by reference.

Curing of the black radiation curable ink formulation 54 can be effected during deposition thereof to the raised pattern on the transfer layer. Such curing can be facilitated by providing intaglio plate 56 with light blocking or masking regions 64 in the areas between recesses 58 of intaglio plate 56 and positioning a UV light (not shown) behind intaglio plate 56. The radiation from the UV light, indicated by arrow 66, passes through the unmasked pattern areas but does not travel through light blocking regions 64, as indicated by arrow 68. During the transfer of black matrix ink, radiation is then emitted from the UV light. However, because of the masking effect of the light blocking regions 64, radiation only travels through the regions between the light blocking regions 64, and, therefore, only the ink in these regions becomes cured. Such light blocking regions 64 could be achieved, for example, by making intaglio plate 56 out of a radiation transparent material, such as glass, and selectively coating regions between recesses 58 of intaglio plate 56 with a radiation reflecting or absorbing material, such as a sputter-deposited or vapor-deposited silicon. Alternatively, the black ink could be hot melt material that by cooling solidifies and transfers upon contact with the embossed pattern. Of course, in this case selective masking is not necessary.

Recesses 58 of intaglio plate 56 can be wider dimensionally than the raised surface pattern 50 formed by the embossing operation illustrated in FIG. 3. Consequently, in the black matrix inking step illustrated in FIG. 4, raised surface pattern 50 on transfer layer 40 does not have to be registered exactly to the center of recesses 58 of intaglio plate 56. Because radiation is only emitted through recesses 58 of intaglio plate 56, black radiation curable ink formulation 54 is only cured and transferred in areas corresponding to recesses 58. Black radiation curable ink formulation 54 is thereby transferred to and thus encapsulates raised surface pattern 50 on transfer layer 18, thereby forming a raised black matrix pattern suitable for receiving the colored inks that form the color filter pattern. The resultant black matrix pattern retains the dimensions of intaglio plate 56 and is independent of the intaglio plate used for embossing the transfer layer.

This black matrix transfer operation provides several advantages compared other methods. During the black matrix ink transferring operation, one desirable effect is that air becomes entrapped in regions between raised surface pattern 50, as can be seen in FIG. 4. This trapped air facilitates prevention of the transfer of black matrix ink into the regions between raised surface pattern 50. Consequently, because none of the residual black matrix ink caused by the doctoring process is transferred, the doctoring step is no longer as critical as it is in other processes. For this reason, this particular ink transfer process is sometimes referred to as the doctorless black matrix ink transfer step. Therefore, although the black radiation curable ink formulation of the present invention containing rheology modifiers can be used in this process, the advantages of these ink formulations will not be fully realized.

Once the raised black matrix surface pattern is formed on the transfer layer (for example, by the methods illustrated in FIGS. 2 or in FIGS. 3 and 4, completion of the flat panel color filter involves formation of the color pixels. Each color pixel typically consists of a red, green, or blue (or yellow, magenta, or cyan) radiation curable ink formulation. In a preferred embodiment of the present invention, after the raised black matrix surface pattern has been applied to the transfer layer, red, green, and blue (or yellow, magenta, and cyan) radiation curable ink formulations are applied, using conventional methods, to the transfer layer within the recesses formed by the raised black matrix surface pattern. For example, the red, green, and blue color cells can be deposited within the recesses formed by the raised black matrix surface pattern using typographic ink or ink jet printing techniques.

Figure 5:
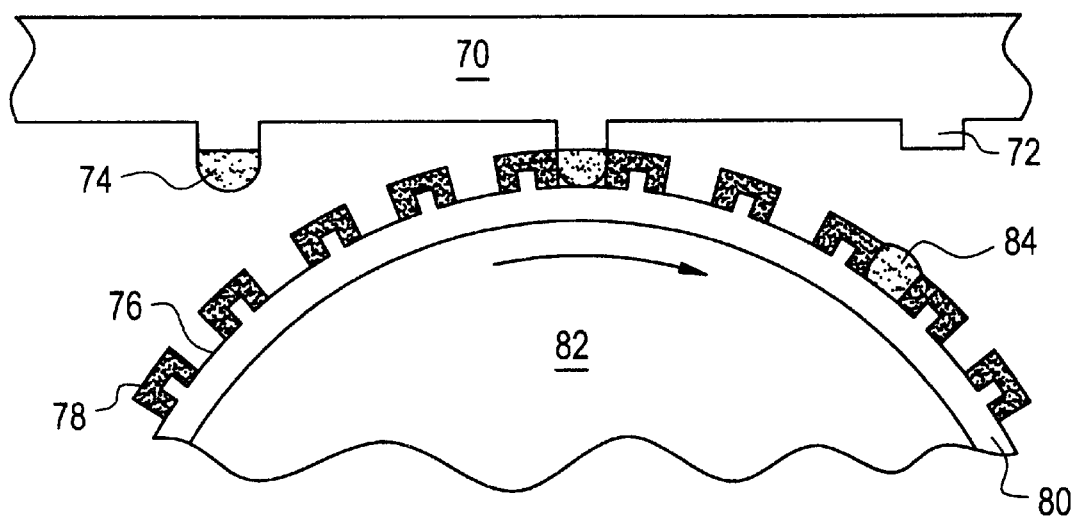
FIG. 5 illustrates a process for depositing colored ink into the recesses formed by a raised black matrix surface pattern to produce a flat panel color filter in accordance with the present invention.

One such process is illustrated in FIG. 5. In FIG. 5, pattern plate 70 comprises a plurality of ink imaging pins 72. Ink imaging pins 72 carry various color inks 74 and deposit color inks 74 within recesses 76 formed by raised black matrix surface pattern 78. As can be seen in the illustration, color ink 74 is preferably still fluid after deposition and may expand somewhat above the surface of raised black matrix surface pattern 78. FIG. 5 illustrates the deposition of one of the color inks onto transfer layer 80 which is carried on collector roll 82 to produce color ink cells 84. This process is then repeated with the other color inks which make up the flat panel color filter.

Preferably, imaging pins 72 are smaller than recesses 76 formed by raised black matrix surface pattern 78, to facilitate depositing the color ink 74 within the black matrix pattern without smearing the ink on the black matrix or mixing the different ink colors.

After depositing the various colored radiation curable ink formulations within recesses 76 formed by raised black matrix surface pattern 78. The entire composite, which consists of transfer layer 80, raised black matrix surface pattern 78, and the colored radiation curable ink formulations deposited in recesses 76 formed by raised black matrix surface pattern 78, can be transferred to a second substrate. Preferably, during transfer to a second substrate, the colored radiation curable ink formulations deposited in recesses 76 formed by raised black matrix surface pattern 78 are in a liquid or otherwise deformable state so that they can be squeezed during the transfer and thereby deformed to a smoother, more uniform shape and thickness. This more uniform shape and thickness can be retained by curing the colored radiation curable ink formulations, such as by exposure to appropriate radiation, while they are being transferred to the second substrate. Further details with regard to ink deposition, transfer layers and associated materials, and transferring the raised black matrix surface pattern colored radiation curable ink formulations deposited in recesses formed therein to a second substrate can be found in U.S. Pat. No. 5,544,582 to Bocko et al. and U.S. Pat. No. 5,514,503 to Evans et al., which are hereby incorporated by reference.

Figure 6:
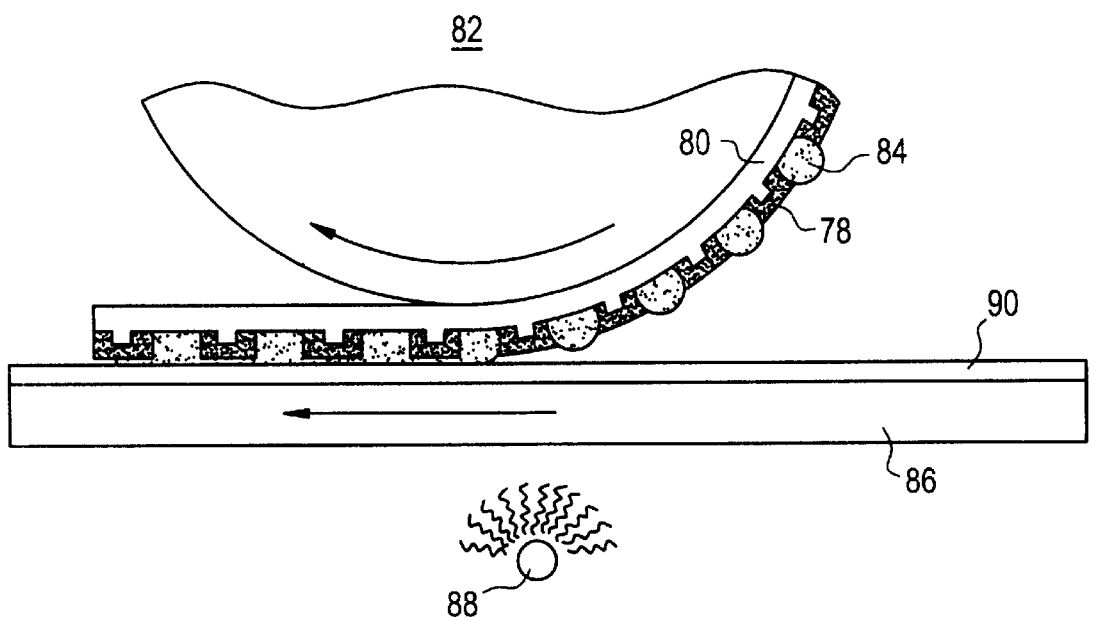
FIG. 6 illustrates a method for depositing a color filter pattern onto a substrate to produce a flat panel color filter in accordance with the present invention.

FIG. 6 illustrates the deposition of raised black matrix surface pattern 78, color ink cells 84, and transfer layer 80 to second substrate 86. During deposition of the composite to the substrate, color ink cells 84 may be in a liquid or otherwise deformable state. Consequently, the ink cells are preferably squeezed, during the deposition, between transfer layer 80 and second substrate 86 and, thereby, deformed to a smoother, more uniform ink dot shape and thickness. The more uniform shape and thickness is retained, preferably by curing simultaneous to the transfer operation. In cases where second substrate 86 is made of a radiation transparent material, such as glass, such curing can be accomplished via UV light 88, which is positioned to emit radiation through second substrate 86. In a preferred embodiment, second transfer layer 90 is employed to help remove transfer layer 80, raised black matrix surface pattern 78, and color ink cells 84 from collector roll 82. Second transfer layer 90 may be applied over raised black matrix surface pattern 78 and color ink cells 84, or deposited onto second substrate 86 prior to the transfer operation. When second transfer layer 90 is applied over black matrix surface pattern 78 and color ink cells 84, the black matrix and inks should be pre-cured, preferably under compression against a release plate. In FIG. 6, second transfer layer 90 is shown preapplied to second substrate 86.

Using the radiation curable ink formulations of the present invention which contain rheology modifiers are advantageous, because they doctor cleanly when excess radiation curable ink formulation is removed from the recessed pattern of an intaglio roll. As a result, no black radiation curable ink formulation is transferred to the recesses formed by the raised black matrix surface pattern when the radiation curable ink formulation is transferred to the transfer layer. Thus, when the recesses formed by the raised matrix surface pattern are filled with, for example, colored ink, the thickness of the colored ink is uniform, and no black ink appears in regions occupied by the colored inks.

As indicated above, at least some of the inks used in the practice of the present invention are radiation curable. By curable, it is meant that the ink cross-links. By radiation curable, it is meant that the ink cross-links when exposed to appropriate radiation. This is regardless of whether the ink also has hot melt thermoplastic properties in the uncured (uncross-linked) state or incorporates a solvent. Sources of radiation effective to cure the radiation curable ink formulations used in the practice of the present invention include ultraviolet (160–400 $\mu$m) radiation sources or visible (400–700 $\mu$m) radiation sources. While curing may be carried out using conventional radiation emitting lamps, a laser, guided by mirrors, could also be employed.

The embodiments set forth above are provided only to illustrate the claimed invention and are not intended in any way to be limiting. For example, in FIG. 2, transfer layer 18 is applied to collector roll 24. However, the present invention is not limited to collector rolls, and thus other types of collector devices, such as plates, could also be used. Likewise, while the embodiments illustrated in FIGS. 2–4 use pattern rollers, such as intaglio rollers, flat pattern plates could also be employed. Other variations of the above methods which are suitable in the practice of the present invention are described in, for example, U.S. Pat. Nos. 5,544,582 to Bocko et al. and 5,514,503 to Evans et al, which are hereby incorporated by reference.

The present invention is further illustrated by the following examples.

EXAMPLES

Example 1
Black Matrix Ink Formulations

The following formulation was used to preparing the black matrix ink in the following examples. Presently, Formulation A is most preferred. All numbers denote weight percents unless otherwise noted.

|  | Formulation A | Formulation B |
| --- | --- | --- |
| SR-497 | 10 | 10 |
| SR-247 | 25 | 25 |
| OTA-480 | 10 | 10 |
| Solsperse 24000 | 5 | 5 |
| Cabot Regal 400R | 25 | 25 |
| SR-248 | 10 | 10 |
| Jaylink 106E | 10 | 0 |
| CAB 551-0.1 | 0 | 10 |
| Lucirin TPO | 3 | 3 |
| Irgacure 369 | 1.5 | 1.5 |
| Quantacure CPTX | 0.5 | 0.5 |

Example 2
Preparation of Carbon Black Dispersion

SR-497, SR-247, OTA-480, and Solsperse 24000 are weighed into beaker. The beaker is placed into 50–60° C. water bath on hot plate and stir at 600 RPM with high-speed disperser until all of the Solsperse is dissolved. Regal 400R is carefully weighed into a separate container and slowly add to the beaker while stirring. As the material in the beaker thickens, the stirring speed is increased up to 1000 RPM. Stirring is continued for at least one hour to break up as much carbon as possible. At this stage, the mixture appears smooth and glossy.

An Eiger Mill is prepared for use referring to the Eiger Mill Operation Guide to set up the mill. Cooling water is turned on. The Eiger Mill is then turned on, and the chamber is filled as directed with 150 ml of 1.0-mm zirconium oxide beads. With the mill off, a small amount of dispersion is slowly poured into the mill funnel. The mill is turned on and the speed slowly increased, making sure that the recirculation tube is positioned over funnel and that the flow from the chamber is directed through the recirculation tube. As material is fed into milling chamber, more dispersion is poured into the funnel. The speed is increased to 2500 RPM, keeping amperage below 6 and temperature below 60° C.

Once all of the material is poured into the funnel, it the mill is permitted to run continuously for two hours, while maintaining temperature and amperage within the desired ranges. After two hours, the dispersion is checked on a Hegman gauge. If there are streaks greater than 2 μm, milling is continued. The dispersion is rechecked every 15 minutes with the Hegman gauge. Milling is discontinued when no streaks greater than 2 μm are present.

Example 3
Preparation of Black Matrix Ink

The dispersion from Example 2 is transferred from the mill into a beaker, and the beaker is placed in a water bath at 60° C. under high-speed disperser. While stirring, SR-248 is added, and then Jaylink 106E or CAB 551-0.1 is slowly added. Stirring is continued until all materials dissolved.

The temperature is reduced to 50° C., and the photoinitiators (Lucirin TPO, Irgacure 369, and Quantacure CPTX) are added. Stirring is continued until the photoinitiators dissolve.

Example 4
Colored Ink Formulations

The following are preferred formulations, set forth in weight percent, for forming the inks used to make the black matrix pattern and color pixels of the color filter.

|  | wt % |
| --- | --- |
| Red pixel ink | |
| SB520 E35 | 7.9 |
| Irganox 1035 | 2.1 |
| Iracure 1850 | 1.9 |
| Quantacure CPTX | 0.6 |
| SR-802 | 5 |
| SR-399 | 16 |
| SR-454 | 20 |
| Dispersed BYK 161 (30% in SR-399) | 8 |
| Irgazin Red A2BN | 13 |
| Paliotol Yellow D1819 | 5 |
| Blue pixel ink | |
| SR-399 | 60.8 |
| Iracure 1850 | 1 |
| Irganox 1035 | 2.3 |
| Quantacure CPTX | 0.3 |
| SR-499 | 15.2 |
| Sarbox 500 E50 | 5.4 |
| BYK 161 (30%) less volatiles | 3.5 |
| Lionel Blue ES | 11.5 |
| Green pixel ink | |
| SR-499 | 13.7 |
| Irganox 1035 | 2.15 |
| Iracure 369 | 2.15 |
| Quantacure CPTX | 0.7 |
| SR-399 | 45.1 |
| Sarbox 500 E50 | 14 |
| BYK 161 (30%) less volatiles | 3.5 |
| Heliogen Green L9361 | 15.2 |
| Paliotol Yellow D1819 | 3.5 |

Example 5
List of Ingredients

Lucirin TPO is a photoinitiator manufactured by BASF of Parsippany, N.J.

SB 520 E35 is aromatic acid acrylate half ester in SR-454, manufactured by Sartomer Company, Exton, Pa.

SR-454 is ethoxylated trimethylolpropane triacrylate, manufactured by Sartomer Company, Exton, Pa.

Irgazin Red A2BN is pigment, manufactured by Ciba (Pigments Division-Ciba Geigy Corp), Newport, Del.

Paliotol Yellow D1819 is pigment, manufactured by BASE Corporation, Mount Olive, N.J.

SR-399 is dipentaerythritol pentacrylate, manufactured by Sartomer Company, Exton, Pa.

Lionol Blue ES is pigment, manufactured by Toyo Ink America, Englewood Cliffs, N.J.

SR-499 is ethoxylated trimethylol propane triacrylate, manufactured by Sartomer Company. Exton, Pa.

Irganox 1035 is an antioxidant manufactured by Ciba Geigy of Tarrytown, N.Y.

Iracure 369 is a photoinitiator manufactured by Ciba Geigy of Tarrytown, N.Y.

Quantacure CPTX is photoinitiator manufactured by Great Lakes Fine Chemicals, Cheshire, England.

Sarbox 500 ESO is an aromatic acid methacrylate half ester in SR454 manufactured by Sartomer Company, Exton, Pa.

BYK 161 (30%) less volatiles is dispersant manufactured by BYK-Chemie USA, Wallingford, Conn. This comes 30 percent in solvent which is preferably removed, and replaced with SR-399.

Heliogen Green L9361 is pigment manufactured by BASF Corporation, Mount Olive, N.J.

Paliotol Yellow D1819 is pigment manufactured by BASF Corporation, Mount Olive, N.J.

Regal 400R is carbon black manufactured by Cabot Corporation, Billerica, Mass.

SR-497 is n-vinyl formamide, manufactured by Sartomer Company, Exton, Pa.

SR-247 is neopentylglycol diacrylate, manufactured by Sartomer Company, Exton, Pa.

SR-248 is neopentylglycol dimethacrylate, manufactured by Sartomer Company, Exton, Pa.

Solsperse 24000 is a dispersant manufactured by Zeneca Inc, Wilmington, Del.

Jaylink 106E is acrylamide functional cellulosic ether manufactured by Bormar Specialties Co., Winsted Conn.

Irgacure 1850 (a 50:50 blend of bis(2,6-dimethoxybenzoyl) 2,4,4-trimethylpentyl phosphine oxide and 1-hydroxycyclohexyl phenyl ketone) is a photoinitiator, manufactured by Ciba Geigy of Tarrytown, N.Y.

SR-802 is an alkoxylated diacrylate, manufactured by Sartomer Company, Exton, Pa.

Although the invention has been described in detail for the purpose of illustration, it is understood that such detail is solely for that purpose, and variations can be made therein by those skilled in the art without departing from the spirit and scope of the invention which is defined by the follower claims.

What is claimed is:

1. A radiation curable ink formulation comprising:

a pigment;

a radiation cross-linkable monomer or oligomer; and a rheology modifier that is functionalized to react with said monomer or oligomer;

said radiation curable ink formulation having tan δ of from about 0.5 to about 1.5.

2. A radiation curable ink formulation according to claim 1, wherein said rheology modifier is a cellulosic material.

3. A radiation curable ink formulation comprising:

a pigment;

a radiation cross-linkable monomer or oligomer; and an acrylamide functionalized cellulosic ether as a rheology modifier;

said radiation curable ink formulation having tan δ of from about 0.5 to about 1.5.

4. A radiation curable ink formulation according to claim 1, wherein said pigment is a black pigment.

5. A radiation curable ink formulation according to claim 1 exhibiting an optical density greater than about 2 from about 300 nm to about 700 nm when deposited and cured at a thickness of less than about 25 microns.

6. A radiation curable ink formulation according to claim 1 exhibiting an optical density greater than about 2 from about 300 nm to about 700 nm when deposited and cured at a thickness of less than about 5 microns.

7. A radiation curable ink formulation according to claim 1, wherein said cross-linkable monomer or oligomer is selected from the group consisting of vinyl ether, maleate/vinyl ether, unsaturated polyester, epoxide, acrylate, methacrylate, and malemide monomers or oligomers.

8. A radiation curable ink formulation according to claim 1, wherein said cross-linkable monomer or oligomer is a multi-functional acrylate monomer or oligomer.

9. A radiation curable ink formulation according to claim 1 further comprising:

a photoinitiator.

10. A radiation curable ink formulation according to claim 9, wherein the photoinitiator is selected from the group consisting of (a) 2-benzyl-2-dimethylamino-1-(4-morpholinophenyl)-butan-1-one, (b) 2,4,6,-trimethylbenzoyl diphenyl phosphine oxide, (c) bis(2,4,6-trimethylbenzoyl) phenyl phosphine oxide, and (d) combinations of two or more of (a) (b) and (c).

11. A radiation curable ink formulation according to claim 9 further comprising:

a spectral sensitizer.

12. A radiation curable ink formulation according to claim 11, wherein the spectral sensitizer is chloropropoxythioxanthone.

13. A radiation curable ink formulation according to claim 1, wherein said formulation comprises from about 2 to about 20%, by weight, of said rheology modifier.

14. A radiation curable ink formulation comprising:

(i) a pigment;

(ii) a radiation cross-linkable monomer or oligomer;

(iii) a rheology modifier;

(iv) a photoinitiator selected from the group consisting of (a) 2-benzyl-2-dimethylamino-1-(4-morpholinophenyl)-butan-1-one, (b) 2,4,6,-trimethylbenzoyl diphenyl phosphine oxide, (c) bis(2,4,6-trimethylbenzoyl) phenyl phosphine oxide, and (d) combinations of two or more of (a), (b), and (c); and (v) chloropropoxythioxanthone as a spectral sensitizer; said radiation curable ink formulation having tan δ of from about 0.5 to about 1.5.

15. A radiation curable ink formulation according to claim 14, wherein the weight ratio of chloropropoxythioxanthone to said photoinitiator is from about 0.1 to about 1.0.

16. A radiation curable ink formulation according to claim 14, wherein the ratio of the weights of said photoinitiator and chloropropoxythioxanthone, taken together, to the weight of the radiation curable ink formulation is from about 0.005 to about 0.10.

* * * * *